United States Patent
Von Stackelberg et al.

(10) Patent No.: US 12,505,461 B2
(45) Date of Patent: Dec. 23, 2025

(54) METHOD AND SYSTEM FOR RECOGNIZING USER SHOPPING INTENT AND UPDATING A GRAPHICAL USER INTERFACE

(71) Applicant: 14013085 CANADA LTD., Toronto (CA)

(72) Inventors: Erik Von Stackelberg, Toronto (CA); Scott Harrington, Toronto (CA); Jason Cottrell, Toronto (CA)

(73) Assignee: 14013085 CANADA LTD., Toronto (CA)

( * ) Notice: Subject to any disclaimer, the term of this patent is extended or adjusted under 35 U.S.C. 154(b) by 256 days.

(21) Appl. No.: 18/160,426

(22) Filed: Jan. 27, 2023

(65) Prior Publication Data

US 2023/0245150 A1 Aug. 3, 2023

Related U.S. Application Data

(60) Provisional application No. 63/303,657, filed on Jan. 27, 2022, provisional application No. 63/303,664, filed on Jan. 27, 2022.

(51) Int. Cl.
*G06Q 30/02* (2023.01)
*G06Q 30/0202* (2023.01)
*G06Q 30/0203* (2023.01)

(52) U.S. Cl.
CPC ..... *G06Q 30/0203* (2013.01); *G06Q 30/0202* (2013.01)

(58) Field of Classification Search
CPC .......................................... G06Q 10/00–90/00
See application file for complete search history.

(56) References Cited

U.S. PATENT DOCUMENTS 10,373,177 B2 * 8/2019 Vijayaraghavan .......................... G06Q 30/0201
10,871,977 B2 12/2020 Hanke et al.
(Continued)

FOREIGN PATENT DOCUMENTS

CN 112199290 A 1/2021
WO 2021127778 A1 7/2021

OTHER PUBLICATIONS

U.S. Office Action for U.S. Appl. No. 17/893,375, dated Jul. 17, 2023, 15 pgs.
(Continued)

*Primary Examiner* — Arif Ullah
(74) *Attorney, Agent, or Firm* — Tarolli, Sundheim, Covell & Tummino LLP

(57) ABSTRACT

A method and system for updating a graphical user interface (GUI) based on self-identified user intents. The method performs the steps of: receiving a self-identified user intent from a user of a computing device with a user interface for a usage session; collecting usage data of the usage session of the user of the computing device and the user interface through an analytics service; labelling each usage session of the user with the self-identified user intent; training a classifier on the usage data of the user session and the self-identified user intent, the classifier for predicting an unclassified user intent of an unclassified user based on an unclassified user usage data and a self-identified unclassified user intent; assigning an assigned user intent to the unclassified user intent by using the classifier on the unclassified user usage data, and the self-identified unclassified user intent, the unclassified user now a classified user; modifying the user interface in response to the assigned user intent for facilitating the assigned user intent of the classified user; and (Continued)

selecting the user intent from a predetermined list of user intents.

11 Claims, 8 Drawing Sheets

(56) References Cited

U.S. PATENT DOCUMENTS

| | | | |
|---|---|---|---|
| 11,138,518 | B1 | 10/2021 | Yu et al. |
| 2011/0246306 | A1* | 10/2011 | Blackhurst ......... G06Q 30/0261 705/14.66 |
| 2015/0294253 | A1 | 10/2015 | Bhat |
| 2016/0292217 | A1 | 10/2016 | Sinha et al. |
| 2020/0134388 | A1 | 4/2020 | Rohde et al. |
| 2020/0320455 | A1 | 10/2020 | Chin et al. |
| 2021/0150576 | A1* | 5/2021 | Sudul ................. G06Q 30/0261 |
| 2021/0232374 | A1 | 7/2021 | Weibel |
| 2021/0232755 | A1 | 7/2021 | Jadhav et al. |
| 2021/0248490 | A1 | 8/2021 | Ma et al. |
| 2023/0131183 | A1 | 4/2023 | Azimi et al. |
| 2023/0199117 | A1* | 6/2023 | Koul ................... H04M 3/5183 379/201.01 |

OTHER PUBLICATIONS

U.S. Final Office Action for U.S. Appl. No. 17/893,375, dated Dec. 13, 2023, 15 pgs.

* cited by examiner

METHOD AND SYSTEM FOR RECOGNIZING USER SHOPPING INTENT AND UPDATING A GRAPHICAL USER INTERFACE

PRIORITY

This nonprovisional application claims priority based upon the following prior U.S. Provisional Patent Applications: Application No. 63/303,657 filed Jan. 27, 2022, and Application No. 63/303,664 filed Jan. 27, 2022, which are hereby incorporated by reference for all purposes.

FIELD OF THE INVENTION

The present specification relates generally to a method and system for updating a graphical user interface (GUI), and more particularly to a method and system for updating a GUI based on recognizing user shopping intent.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

Graphical User Interfaces (GUI) such as web pages can be configured to change based on the context in which the device or web page is being used or viewed.

Dynamically updating a Graphical User Interface based on a usage data provided from the device/Graphical User Interface typically relies on sensor data to provide simple layout-based updates to a graphical user interface.

For example, front-end development packages such as REACT or BOOTSTRAP are configured to allow for GUI layout changes to a webpage/graphical user interface based on device-detected criteria such as the size and/or the orientation of the screen.

Other GUI packages may allow for other context-related GUI changes. For instance, in some examples a web browser can provide information to the GUI client or application that the device's audio output is silenced or muted. In these examples the GUI may pop-up a warning that the device's audio output is muted and remind the user to turn up the device's volume.

In other contexts, updates to a GUI may be driven by conditional logic encoded in personalization engines; these engines look for specific user behaviours to trigger changes to a webpage's content or functionality.

Also, As the number of users for a given single graphical user interface (GUI) grows, the friction between the experience that the GUI delivers and the one that is perceived to be required by different users also grows.

A single GUI may serve the functional needs of many different users in a variety of contexts. For example, an apparel ecommerce website allows users to interact with its GUI to make purchases directly online. However, not every single user interacting with the GUI is intending to make a purchase at any given time. Though users understand that the functionality of placing an order or making a purchase for merchandise is possible, users also demonstrate smaller, specific needs and intents—at any given moment—that are within the broader goal of making a purchase. For example, an user may decide to interact with the GUI to better understand new merchandise offered by the website with no desire to make a purchase during the interaction. Or, a consumer may drive their shopping process on the basis of different mindsets, such as a desire to identify the highest quality product, most novel product, or cheapest product— all of which can lead to different needs or behaviours.

Historical behaviour data and other information on groups of users may be used to automatically generate an optimal user interface using adaptations applied to a template library. Known approaches to simplify user interface design generally rely on libraries of pre-designed components, but also rely on the expertise of the application designer to understand how to optimally arrange and style these components. Some previous improvements on this standard approach have been made, but have either focused on optimizing the library of templates and UI components (example: US20210232374) or focus on personalizing content within a set UI layout.

Accordingly, there remains a need for improvements in the art.

SUMMARY OF THE INVENTION

In an aspect, there is provided a method comprising, displaying an intercept survey/popup survey to users of a computing device and graphical user interface to record the user's self-identified intent along with additional preferences, collecting the users' survey responses and usage data from the computing device and the graphical user interface through an analytics service such as Google Analytics, the usage data generated by users of the computing device and the graphical user interface; segmenting each of the user's usage sessions into classes defined by their self-identified intent captured in the intercept survey/popup survey displayed to users on the computing device and graphical user interface; training a classification model for predicting the user intent of an unclassified user based on their unclassified user usage data and preferences, the training performed on the data using the self-identified intents from the survey as labels for the data; providing access to the classification model; assigning an assigned user intent to the unclassified user using the classification model and unclassified user usage data and relevant preferences self-identified by the unclassified user themselves, the unclassified user usage data from an unclassified user computing device and the graphical user interface and user preferences gathered through the same computing device and graphical user interface, and the unclassified user is now a classified user; modifying the graphical user interface in response to the assigned user intent in order to facilitate the assigned user intent of the classified user; the modification may take place in the system, device, or channel that the user is currently interacting with, or a separate system, device, or channel that the user is or may interact with during the same session (for example, a user expressing intent in a chat interface may have corresponding GUI updated on a webpage).

According to an embodiment of the invention, there is provided a method, comprising: receiving a self-identified user intent from a user of a computing device with a user interface for a usage session; collecting usage data of the usage session of the user of the computing device and the user interface through an analytics service; labelling each usage session of the user with the self-identified user intent; training a classifier on the usage data of the user session and the self-identified user intent, the classifier for predicting an unclassified user intent of an unclassified user based on an unclassified user usage data and a self-identified unclassified user intent; assigning an assigned user intent to the unclassified user intent by using the classifier on the unclassified user usage data, and the self-identified unclassified user intent, the unclassified user now a classified user; modifying the user interface in response to the assigned user intent for facilitating the assigned user intent of the classified user; and wherein the user intent is selected from a predetermined list of user intents.

The method may further comprise: displaying an intercept survey to the user of the computing device at the start of the usage session; collecting the self-identified intent of the user through the intercept survey.

In a further embodiment, the method may still further comprise: receiving the self-identified user intent and shopping preferences from the user of the computing device with the user interface for the usage session; labelling each usage session of the user with the self-identified user intent and the shopping preference; training the classifier on the usage data of the user session, the self-identified user intent, and the shopping preferences, the classifier for predicting the unclassified user intent of the unclassified user based on the unclassified user usage data, the self-identified unclassified user intent, and unclassified user shopping preferences; assigning the assigned user intent to the unclassified user intent by using the classifier on the unclassified user usage data, the self-identified unclassified user intent, and the unclassified user shopping preferences, the unclassified user now a classified user; modifying the user interface in response to the assigned user intent for facilitating the assigned user intent and classified user shopping preferences of the classified user.

The modifying step of the method may further comprise: receiving a secondary user intent of the classified user, the secondary user intent from a secondary communication channel; modifying the user interface in response to the assigned user intent and the secondary user intent for facilitating the assigned user intent and the secondary user intent of the classified user.

In a further embodiment, the self-identified user intent is provided automatically by a digital representation of the user.

The predetermined list of user intents may include: quality perfectionist, novelty conscious/fashion conscious, price conscious, habitual shopper, brand loyalist, impulse buyer, recreational shopper, and convenience seeker. The user intent may further include the shopping preferences of the user.

According to another embodiment of the invention, there is provided a system, comprising: a memory; a processor, operatively connected to the memory, the processor configured to: receive a self-identified user intent from a user of a computing device with a user interface for a usage session; collect usage data of the usage session of the user of the computing device and the user interface through an analytics service; label each usage session of the user with the self-identified user intent; train a classifier on the usage data of the user session and the self-identified user intent, the classifier for predicting an unclassified user intent of an unclassified user based on an unclassified user usage data and a self-identified unclassified user intent; assign an assigned user intent to the unclassified user intent by using the classifier on the unclassified user usage data, and the self-identified unclassified user intent, the unclassified user now a classified user; modify the user interface in response to the assigned user intent for facilitating the assigned user intent of the classified user; and wherein the user intent is selected from a predetermined list of user intents.

In a further embodiment, in order to receive a self-identified user intent from a user of a computing device with a user interface for a usage session, the system may be further configured to: display an intercept survey to the user of the computing device at the start of the usage session; and collect the self-identified intent of the user through the intercept survey.

In a still further embodiment, the system may be further configured to: receive the self-identified user intent and shopping preferences from the user of the computing device with the user interface for the usage session; labelling each usage session of the user with the self-identified user intent and the shopping preference; train the classifier on the usage data of the user session, the self-identified user intent, and the shopping preferences, the classifier for predicting the unclassified user intent of the unclassified user based on the unclassified user usage data, the self-identified unclassified user intent, and unclassified user shopping preferences; assign the assigned user intent to the unclassified user intent by using the classifier on the unclassified user usage data, the self-identified unclassified user intent, and the unclassified user shopping preferences, the unclassified user now a classified user; modify the user interface in response to the assigned user intent for facilitating the assigned user intent and classified user shopping preferences of the classified user.

In a still further embodiment, to modify the user interface in response to the assigned user intent for facilitating the assigned user intent of the classified user, the system may be further configured to: receive a secondary user intent of the classified user, the secondary user intent from a secondary communication channel; modify the user interface in response to the assigned user intent and the secondary user intent for facilitating the assigned user intent and the secondary user intent of the classified user.

In other embodiments, the self-identified user intent may be provided automatically by a digital representation of the user. The predetermined list of user intents are quality perfectionist, novelty conscious/fashion conscious, price conscious, habitual shopper, brand loyalist, impulse buyer, recreational shopper, and convenience seeker. The user intent may include the shopping preferences of the user.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicated like or corresponding elements in the drawings.

DETAILED DESCRIPTION OF THE EMBODIMENTS

Figure 1:
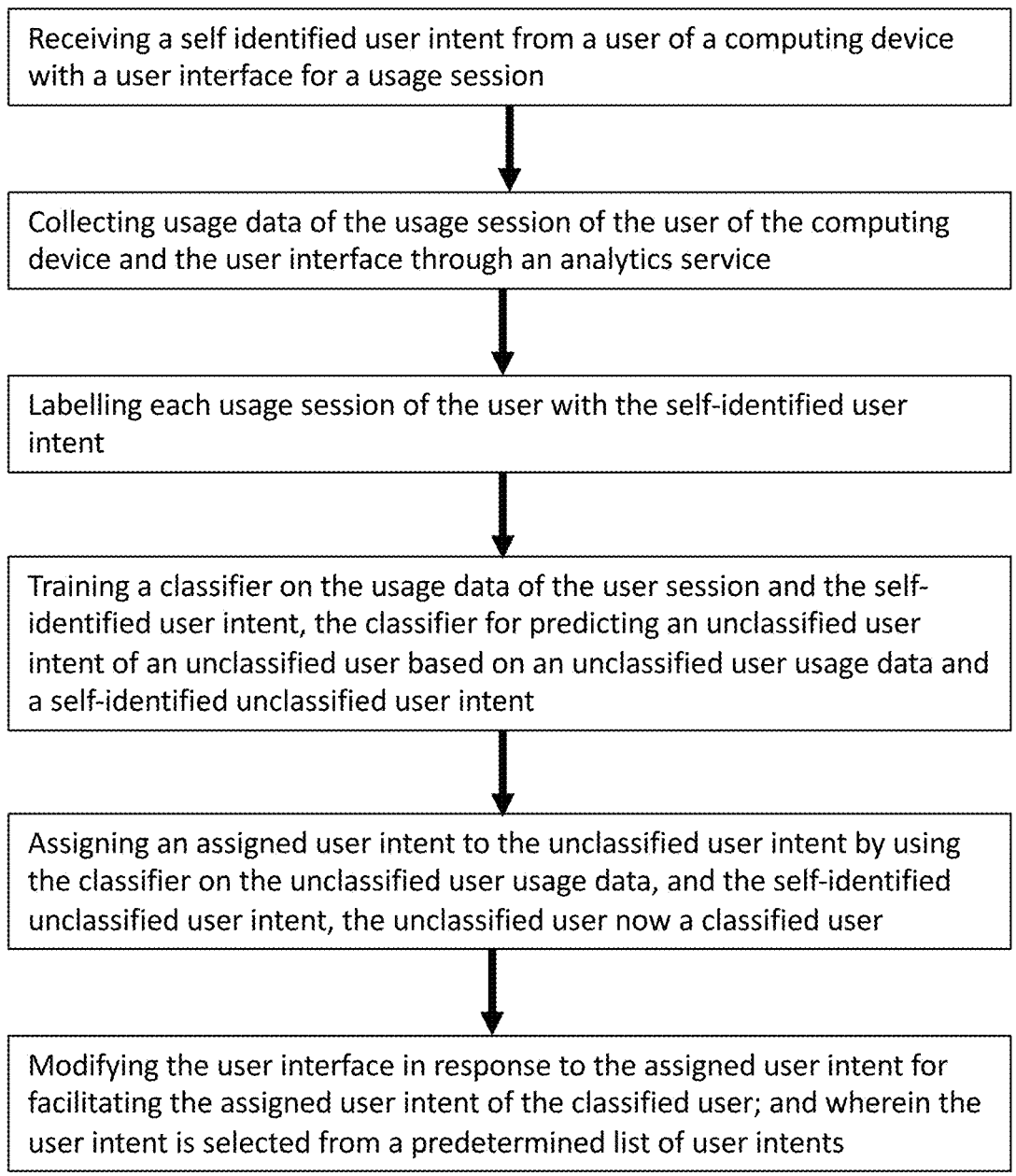
FIG. 1 is a representative flowchart depicting an embodiment of the present disclosure.

The present invention generally to a method and system for updating a graphical user interface (GUI), and more particularly to a method and system for updating a GUI based on recognizing user shopping intent.

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations.

All of the implementations described below are exemplary implementations provided to enable persons skilled in the art to make or use the embodiments of the disclosure and are not intended to limit the scope of the disclosure. The scope of the invention is defined by the claims.

It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings.

It should be understood that the invention is limited to the subject matter provided by the claims, and that the invention is not limited to the particular aspects depicted and described.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

In an aspect of the present invention, an approach for updating a graphical user interface based on machine learning follows two training steps: 1) Training to capture distinct user behaviours and intents in the form of dynamic segments; and 2) Training to identify and classify the user according to the classes of behaviours discovered in the behavioural step. This approach incorporates elements of WO2021127778 (U.S. Ser. No. 17/768,741 filed on 21 Dec. 2020), US20210248490A1 (U.S. Ser. No. 17/167,790 filed on 4 Feb. 2021), and U.S. Ser. No. 17/893,375 filed on 23 Aug. 2022, which are hereby incorporated by reference.

In an embodiment, there is provided a method comprising, displaying an intercept survey/popup survey to users of a computing device and graphical user interface to record the user's self-identified intent along with additional preferences, collecting the users' survey responses and usage data from the computing device and the graphical user interface through an analytics service such as Google Analytics, the usage data generated by users of the computing device and the graphical user interface; segmenting each of the user's usage sessions into classes defined by their self-identified intent captured in the intercept survey/popup survey displayed to users on the computing device and graphical user interface; training a classification model for predicting the user intent of an unclassified user based on their unclassified user usage data and preferences, the training performed on the data using the self-identified intents from the survey as labels for the data; providing access to the classification model; assigning an assigned user intent to the unclassified user using the classification model and unclassified user usage data and relevant preferences self-identified by the unclassified user themselves, the unclassified user usage data from an unclassified user computing device and the graphical user interface and user preferences gathered through the same computing device and graphical user interface, and the unclassified user is now a classified user; modifying the graphical user interface in response to the assigned user intent in order to facilitate the assigned user intent of the classified user; the modification may take place in the system, device, or channel that the user is currently interacting with, or a separate system, device, or channel that the user is or may interact with during the same session (for example, a user expressing intent in a chat interface may have corresponding GUI updated on a webpage).

Behavioral segmentation involves the following steps:

An intercept/popup survey or similar interface is displayed to users visiting a website to receive and record each user's self-identified intent for that visit to the website (a usage session for the website). The users' survey responses are passed as events into a web analytics service such as Google Analytics™, and both these events and other usage data are collected through an analytics service such as Google Analytics™. Other examples of analytics services are Mixpanel, Hotjar and other product analytics tools Once sufficient user usage data is collected and stored, the user usage data is processed to make it suitable for machine learning models to read as inputs.

User usage data points that are used include: e.g. device type, user attributes, user actions, pages viewed, duration of session, features interacted with, etc. The user usage data consists of inputs in numerical and categorical forms, with specific treatment for each input is required in order to use machine learning models;

Consider an array with rows representing distinct users and columns representing inputs describing users (such as the type of device, which site they're coming from, how long they're spending on the site, which pages did they land on, which pages did they spend most time on, etc.). Once the columns, i.e. machine learning features, are completely transformed, they are ready to serve as training data for the classification step. A given user's response to the intercept survey, which has been captured as a feature and/or column in the array example above, becomes the label for that user's intent. These labels serve as a source of truth training set for mapping future users to a specific segment given the same inputs.

Preferably, the self-identified user intent is selected from a pre-determined list of intents. For example, considering a shopping website, the list of intents may be based off of consumer styles. One such list may include:

Quality Perfectionist—a consumer who is seeking the "best" products in their category;

Novelty Conscious/Fashion Conscious—a consumer who is seeking the newest or currently trending items in a category, as well as the most variety (fashion being a focused sub-type of novelty);

Price Conscious—a consumer who is seeking the best price, deal and/or discount in a category;

Habitual Shopper—a consumer who primarily follows their past purchases and shopping habits;

Brand Loyalist—a consumer who give priority to trusted and/or known brands;

Impulse Buyer—a consumer who does not plan their shopping experience, generally unconcerned with spending amounts or finding "value"; and Convenience Seeker—a consumer who shops online due to ease of use and access to products Classification involves the following steps:

In the training phase, a classification model is trained using the labelled information (self-identified user intent) from the previous activity: Once the columns, i.e. machine learning features, are completely transformed, a logistic regression algorithm is applied to reveal the features and the value of the features that most strongly represent users for each behavioural segment labeled in the previous step.

Once the model is trained to sufficient and acceptable accuracy, it will be hosted to make predictions for new incoming users (i.e. unclassified users) that generate the data required in the classification model. The prediction engine, in real-time, may then classify the user and serve up the appropriate modified design/component in the GUI.

In some embodiments the machine learning system is implemented on a remote server or cloud computing environment.

In another embodiment the machine learning system (or model) is implemented as a JAVASCRIPT library that resides on the same local machine as the GUI. The machine learning system (or model) would then use the same processor as used by the GUI/User Interface to process the transformed usage data.

In yet another embodiment the machine learning system is implemented both on the server and on the client device. In this embodiment the machine learning system is trained on the server where computing power is more readily available. Once the machine learning system training is complete a trained model is distributed to the client device(s). This model can then be used to identify user intentions on the client device.

It will be appreciated that, in some embodiments, the machine learning system is taught to identify user intentions by being trained on training (or historical) data. That is, the machine learning system is trained (or learns) using pre-generated training data sets that correspond to specific user intentions.

A properly trained machine learning system is configured to identify a user intention from collected and transformed usage data. For instance, a properly trained machine learning system would be able to apply patterns it had learned during the training phase to identify patterns in the collected and transformed usage data, thereby identifying (or classifying) the user intention.

In an embodiment where real-world behaviour-based data is not available via a web analytics package, surveys of consumers can be conducted where the respondents self-report on shopping behaviours for a recent purchase, alongside key decision making factors or drivers for that purchase. The respondent's selection of a key decision making driver becomes the label for that respondent's intent and associated survey responses. This becomes the raw training data that is then analyzed through a logistic regression algorithm.

In some embodiments the data collection is configured to stop once a number of data points has been collected (e.g., 800 data points). In other embodiments, a timeframe is chosen, and all user session data is collected for that period (e.g. a 2-week data collection period).

The training regimen may also include a refinement phase. In this phase different training variables are manipulated to refine the machine learning model. Examples of variables that can be modified include, but are not limited to, data collection size (I.e., changing the number of data points from 800 to another amount), the data collected, the number of personas (or user intentions), the language used in the intercept survey, etc. It will be appreciated that other methods of refining the training regimen could be used without departing from the scope of this disclosure.

As depicted in FIG. 1, a user intention associated with the transformed usage data is identified by the machine learning system once the transformed usage data has been processed. The machine learning system (ML system) processes the transformed data by comparing the transformed data with historical data it obtained during the training phase. The ML system may then identify patterns in the transformed data that correspond to intention patterns the ML system had learned during the training phase. These similar patterns can then be used to discern the probable intention of the user based on the transformed usage data.

In an embodiment, this identified user intention is then used to modify the displayed GUI without the need to modify the implementation of the graphical user interface. That is, the GUI will be updated in response to the identified user intention without having to modify the underlying code of the GUI.

In another embodiment, the identified user intention is used to modify a GUI from another channel or section of a website. For example, on an e-commerce website, interactions in a secondary interface such as a chat dialog window that reveal a specific user intent could drive changes to functionality in the check-out.

In some embodiments the identified user intention is associated with a prefabricated user interface component (or GUI element). Pre-fabricated user elements do not require any additional code (or modification of code) in order to be added to the GUI.

Examples of pre-fabricated user interface components include, but are not limited to, already implemented buttons associated with specific functionality, different color schemes, windows, drop-down lists, and any other user interface element. The arrangement of components, their proportion, and their content or functionality may also be modified.

Once the GUI has been updated with the prefabricated user interface component data is returned to the ML system on how the user interacted with the prefabricated user interface component. In this embodiment additional data related to the task that the user completed (i.e., post-completion data) is collected from the client device. In an e-commerce site, for example, this data could take the form of a post-purchase survey asking the user to describe the reasons for their purpose, to help ascertain their intent for the prior shopping session. This data is then transformed and sent to the ML system.

This post-completion data is then used by the ML system to determine whether the GUI change was a success or a failure. The ML system processes the post-completion data along with the previously collected user and GUI application data, and uses this data to refine both its heuristics for identifying a user's probable intention and appropriate interface components to display to support that intent.

In this embodiment if a user completes the intention by using the prefabricated user interface component that was presented to the user then the GUI change is considered a success. If the user does not use the prefabricated user interface component to complete the intention but instead uses another part of the GUI then the GUI change is considered a failure. It will be appreciated that other events or actions could be used to determine whether the GUI change is a success or failure such as, but not limited to, hovering over the prefabricated user interface component, performing an action that is influenced by, but not necessarily related to the prefabricated user interface component (e.g., opening a chat window instead of using the prefabricated user interface component to compose an email), or hovering over some other part of the GUI.

Application & Refinement of Models

Figure 2:
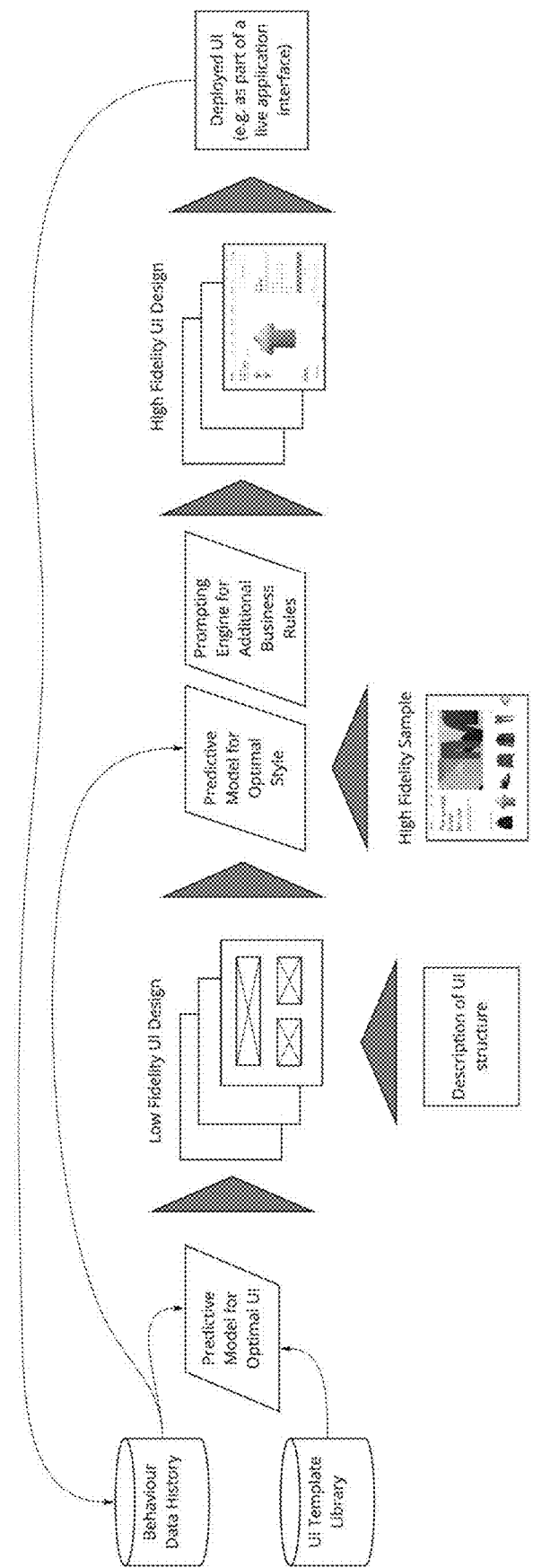
FIG. 2 is a representative flowchart depicting an embodiment of the flowchart of FIG. 1.

The sequence depicted in FIG. 2 is an example of how a GUI is modified based on an identified user intention.

In this example, the user is shopping on an e-commerce website. The analytics engine determines that the user spends a significant duration hovering their cursor over user reviews with terms such as "quality" or "best" in their heading. The user also answers or has answered a brief questionnaire, either as a pop-up survey or in a separate session, such as a chat window with a live agent that asks them how they prefer to shop.

This usage data (that is, the duration spent hovering over these user reviews) and the user's self-identified preferences captured in the secondary interface (i.e. the chat window) are collected.

In an embodiment the collected data is transmitted to a cloud-based server for transformation and processing. For instance, this usage data is collected by the browser rendering the GUI, then transmitted to the server hosting the cloud (or web) based application for transformation and processing.

Once the collected usage data and user preferences are received by the server hosting the web-based application the data is transformed. The data is transformed so that it can be processed by a machine learning system. Once the data is transformed it is then sent to the machine learning system for processing. The machine learning system, using patterns learned during previous training runs, then classifies (or identifies) a user intention based on the transformed usage data and user preferences.

In this case depicted the usage data includes data associated with reading user reviews focused on product quality. The machine learning system would likely identify that the transformed usage data is consistent with a user with an intent to find a product with the highest quality. The machine learning system would also use the user preferences captured through the secondary interface to strengthen its prediction.

Once the machine learning system has identified the likely user intention (in this case, a quality-seeking user), the server hosting the cloud based application is configured to modify another screen or page of the GUI to display a prefabricated (I.e., pre-coded) user interface component (or GUI element). In this example, on another page on the website, a default user interface component is replaced by a prefabricated user interface component that is associated with quality-seeking user.

Additional Training

The user-session data may be collected directly from the graphical user interface or the browser. The data attributes on users may be directly retrieved from the web browser. These attributes may include but are not limited to:

Referring Source Site (which site the user is arriving from);
Device type (Tablet, Mobile or Desktop);
Session identifier (unique ID that identifies a particular session);
User identifier (unique ID that identifies a particular user);
Browser Operating System (Edge, Chrome, Firefox, etc);
Length of time spent during the session;
The time of day, week and year the session took place;
Number of pages viewed during the session;
The specific page paths interacted by the user during the session;
Specific actions and/or events triggered by the user during the session that relate to the site (i.e. 'clicked add to cart', 'visited the sale page');
Whether the user is an existing or a new visitor; and
If the user made a purchase during the session;

Some of these attributes may already exist within the graphical user interface or the web browser, however many others require configuration so that the graphical user interface or web browser can send the intended data. Such as defining specific actions and/or events for a given graphical user interface or website to identify and collect data.

The user-level data is stored in a separate storage database. In some scenarios, no prior user data is collected. User-session data is required to meet a minimum volume in order to apply machine learning models (for example, 10,000 users). Of the above listed data collected from a given session, the data is sent to a database for storage. Data associated with each session is referenced with the combination of UserID and the SessionID and stored in rows in a tabular database.

The user-session data is collected in the form of attributes that are collected from the web browser and subsequently stored in a separate storage database. The user data is then stored is in the form of tables in a relational database where each row of entry holds predetermined data types and characteristics. For example, each row represents a session interacted by a specific user, along with the data attributes associated with that user's session such as the device that was operated on, which site the user came from, etc.

Data is continuously collected until the collected data meets a sufficient threshold of volume. A threshold on the amount of sessions required to be collected is determined as the data is collected. In an embodiment, an initial rule is set for 10,000 unique users. This threshold may be amended higher or lower depending on the quality of the data that is collected.

The 'intent' is defined as an user's clearly formulated state of purpose, and can be in various forms. In an embodiment, functional, task-based purposes can be intents such as completing a purchase, submitting an email, finding the customer support number, checking order history, etc. In another embodiment, higher-level user emotional purposes may be intents such as happiness, anger, frustration, annoyance, impatience, anxiousness, etc. In another embodiment, a user's decision-making drivers may be intents such as "seeking quality," "seeking novelty," "seeking value," such as in an e-commerce shopping session where product purchase decisions are made based on different shopper mindsets. In an embodiment, no intent may be a user intent. In an embodiment, no recognized intent may be a user intent. The intents are non-overlapping and no two intents can be assigned to a single group of users.

Before applying the trained model on a new user dataset to assign new users to classes/behavioural segments, the features (key categories of data which act as signals for intent) used to train the model must be identified in the new dataset. Some of these features may be easily identified (for example, age, gender, login device type) but other features may require proxies (for example, accessing a certain URL can be used as proxy for using a product comparison tool.)

Ideally, all of the features present in the trained model are identified in the new user dataset. If that is the case, the trained model can be implemented on the dataset to assign the unclassified users to the appropriate class. However, if some features cannot be identified in the new user dataset, the original trained model has to be retrained on a modified version of the original data set that also has those features eliminated. This retraining may lower the accuracy of the model by a small percentage because some features will have been removed.

The trained model is then ready to take the new user dataset as an input, and assign the users their consumer styles.

As a further embodiment, the method may also use behaviours between two modalities to optimize a multimodal customer experience. As an example, consider a website with an integrated chat interface. By applying natural language processing (NLP) to the chat contents, the method may determine user intent and adjust the graphical interface accordingly. For example, if it is seen in the chat logs that users frequently ask about shipping information, then the system may adjust the interface to make that information more prominent. Alternatively, if it is seen that there are a large number of requests for order status for returning customers, the system may adjust the interface to make order tracking more prominent for returning customers.

In another embodiment, the information collected from a downstream interface may be used to modify an upstream experience that leads to higher satisfaction with the downstream interface. As an example, the system may infer propensity to interact with a communication channel (such as chat) based on a user's behaviour within a graphical interface. Using that predictive model the system may then optimize the experience by proactively initiating chat-based conversations with some users while directing others to phone support in order to maximize probability of success.

Natural Language Processing (NLP) may be applied to the analysis of chat logs, for example, to the extent of a) identifying themes and b) identifying frequency of those themes. These user issues may be taken as a given, and automation applied to responding to these questions (e.g. in the form of artificial intelligence (AI) chatbots). However, the method herein may use AI and Machine Learning to address the problem at a more fundamental level by understanding the relationship of the user experience to the problems surfaced and modifying that experience in order to reduce or eliminate the customer issue.

Analysis of user behaviour has also been used to improve individual interfaces, for example by NB testing multiple variants of an experience. However, the behaviour data is observed for and applied to the same modality (e.g. observed behaviour in a graphical interface is used to determine the optimal experience for that same interface). Other solutions gather general data on user behaviour and use that to prioritize business activities, however these are typically limited to communications content and personalization (e.g. a user who has recently complained about a product problem will not receive the promotion to buy the new version of that product). These observations have not been used to optimize the user experience across modalities.

In an aspect, the system as depicted in FIG. 2 comprises: A library of UI components and templates of their variants; A historical record of user interactions with the components in different contexts; A predictive model for which components will perform best given a particular context and how to style them optimally; A UI engine capable of constructing an interface for a particular context; and A prompting engine that can solicit additional information needed to complete the interface.

Figure 3:
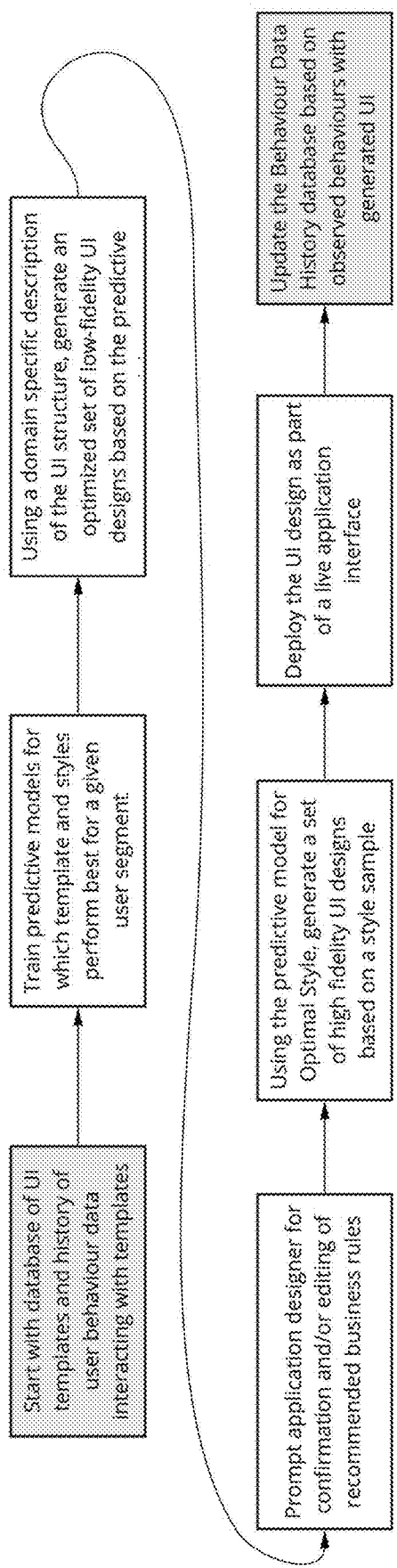
FIG. 3 is a representative flowchart depicting an embodiment of the flowchart of FIG. 1.
Figure 4:
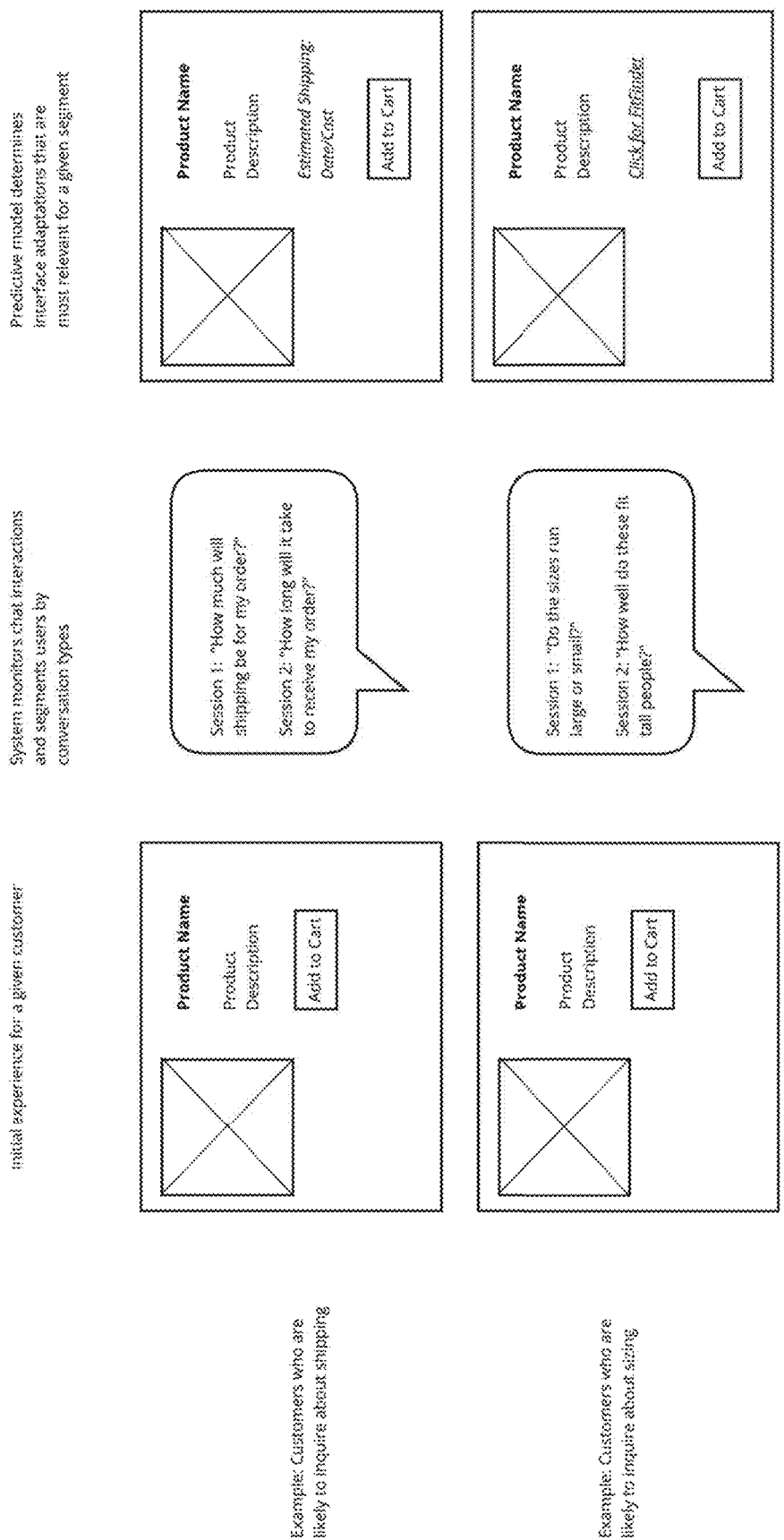
FIG. 4 is a representative block diagram depicting an embodiment of a multi-channel implementation.
Figure 5:
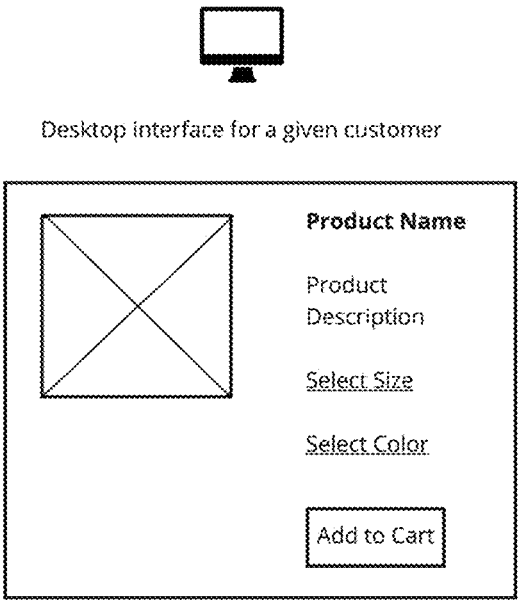
FIG. 5 is a representative block diagram depicting an embodiment of FIG. 4.
Figure 5:
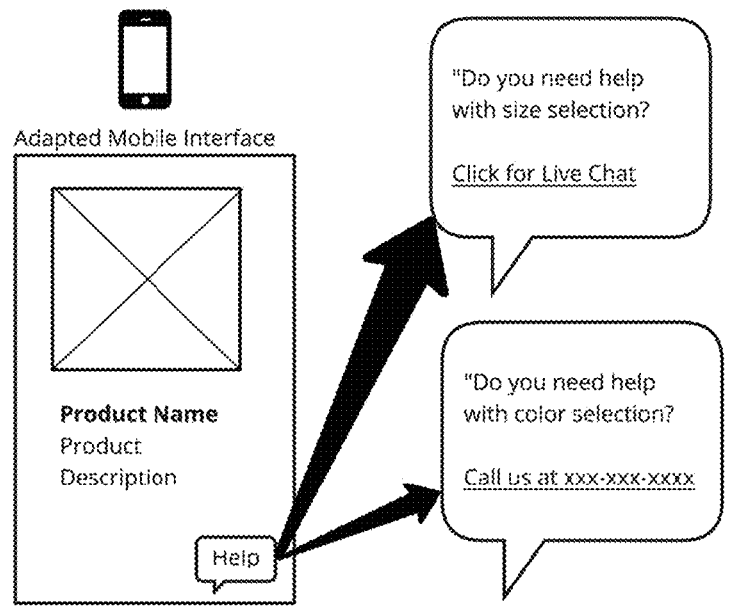
Figure 6:
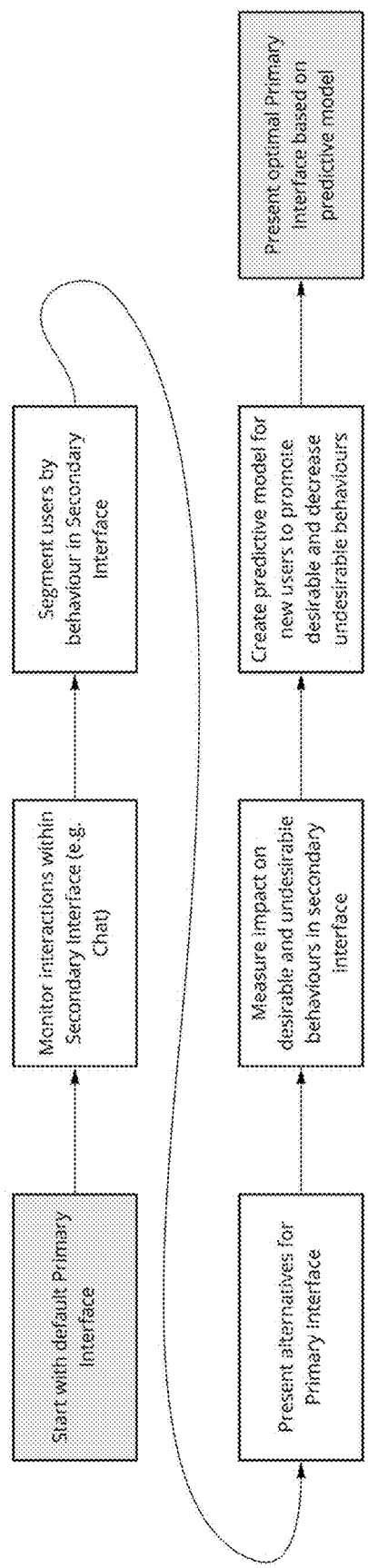
FIG. 6 is a representative flowchart depicting an embodiment of a multi-channel implementation.

In another aspect, as depicted in FIG. 3, the method comprises the following sequence of steps: Start with database of UI templates and history of user behaviour data interacting with templates; Train predictive models for which template and styles perform best for a given user segment; Using a domain specific description of the UI structure, generate an optimized set of low-fidelity UI designs based on the predictive model; Using the predictive model for Optimal Style, generate a set of high fidelity UI designs based on a style sample; Deploy the UI design as part of a live application interface; Update the Behaviour Data History database based on observed behaviours with generated UI.

In some embodiments, the solution described here may have a number of potential differences or advantages over existing solutions. In one embodiment, the system and/or method is capable of self-composing an interface from a library of templates using a predictive model trained on observed user behavior, as opposed to existing approaches that require the application designer to compose the interface manually from tem plated components.

The system and/or method may further self-learns over time by observing the results of its proposed designs and feeding those results back into a predictive model.

Accordingly, the system and/or method requires minimal input from the application designer. Where additional business rules are needed beyond the scope of the template library (e.g. free shipping rules for an ecommerce site), the system may recommend optimal rules for confirmation.

The system and/or method is further capable of adapting the style of the templates based on a sample, as opposed to previous approaches that generally require the application design to construct styles and themes manually for the tem plated components.

In another aspect, the system and method may operate on a combination of communication channels used by the same user. For example, there may be a primary user interface (A) and a secondary user interface (B), with a means of tracking user behavior and interactions in each user interface. Then the predictive model may be derived from interface B to modify interface A. The model thereby provides the ability to derive these adaptations across modalities (e.g. chat behaviours influencing a graphical user interface).

Accordingly, in another aspect, the method may then consist of the following sequence of steps:

Start with default Primary Interface and monitor interactions within Secondary Interface (e.g. Chat). Segment users by behaviour in the Secondary Interface using a machine learning model. Next, resent alternatives for Primary Interface and measure impact on desirable and undesirable behaviours in secondary interface.

The method may then create a predictive model for new users to promote desirable and decrease undesirable behaviours, and present an optimal Primary Interface based on predictive model.

In an embodiment, the solution described here may have several potential differences and advantages over existing solutions, including:

Existing solutions such as recommendation engines use a diverse source of information about a user, but are limited in their ability to alter the experience (typically limited to populating and ranking lists of items)

Existing solutions focused on conversational interfaces, such as chat, can derive insights using natural language processing. However, without an understanding of how these relate to other parts of the user interface, they are typically limited to prioritizing self-help information in interfaces such as Frequently Asked Question lists and search.

By understanding how behaviour in one modality relates to behaviour in another, this system and method may enable more advanced optimizations as compared to existing solutions, as illustrated in the example above where insights on frequently asked questions can be used to modify a user interface in order to eliminate the underlying cause of confusion.

In another embodiment, the system and method provide an approach that allows a highly customized user interface to be constructed from scratch, tailored to the digital representation of the user (a "digital twin"). The digital twin is constructed using a combination of simple prompts from the user, understanding the user's transaction history, and use of transactional API's to act on behalf of the user.

As an example, input is collected from the user through ad-hoc voice or chat prompts over a period of time. Examples of such prompts:

I'm running low on [X]/I'm out of [X]
[Person's] birthday is next month
[Child] needs school clothes Additional input may then be generated in the form of the user's transaction and returns history. Using these inputs, the system learns over time the user's purchase patterns, frequency of purchases, preferred price points and brands, and other attributes that influence the user's shopping behaviour. Such a trained machine learning (ML) model can then construct optimal interfaces through which the user can efficiently conduct their transactions.

This problem has been partially solved in some business-to-business (B2B) industries, where vendors have provided application programming interfaces (API's) to be used for procurement which can be integrated into automated solutions. However, the reason this works for the B2B environment is that the purchase process is highly procedural and can be represented with clearly defined business rules. For business-to-consumer (B2C), solutions have focused on AI assistants that can operate on behalf of the, for example facilitating conversations between an AI assistant and a human (see Google Duplex™). However, these are primarily task-driven agents acting on very explicit instructions. These instructions are clear enough that the AI can complete the transaction, but do not support more complex decision making scenarios.

In an embodiment, a personal digital twin (digital representation of the user) is provided that is much more agentive in its ability to anticipate user needs and perform in complex scenarios where the AI cannot completely act on behalf of the user, and a mixture of human and AI interactions are required.

Figure 7:
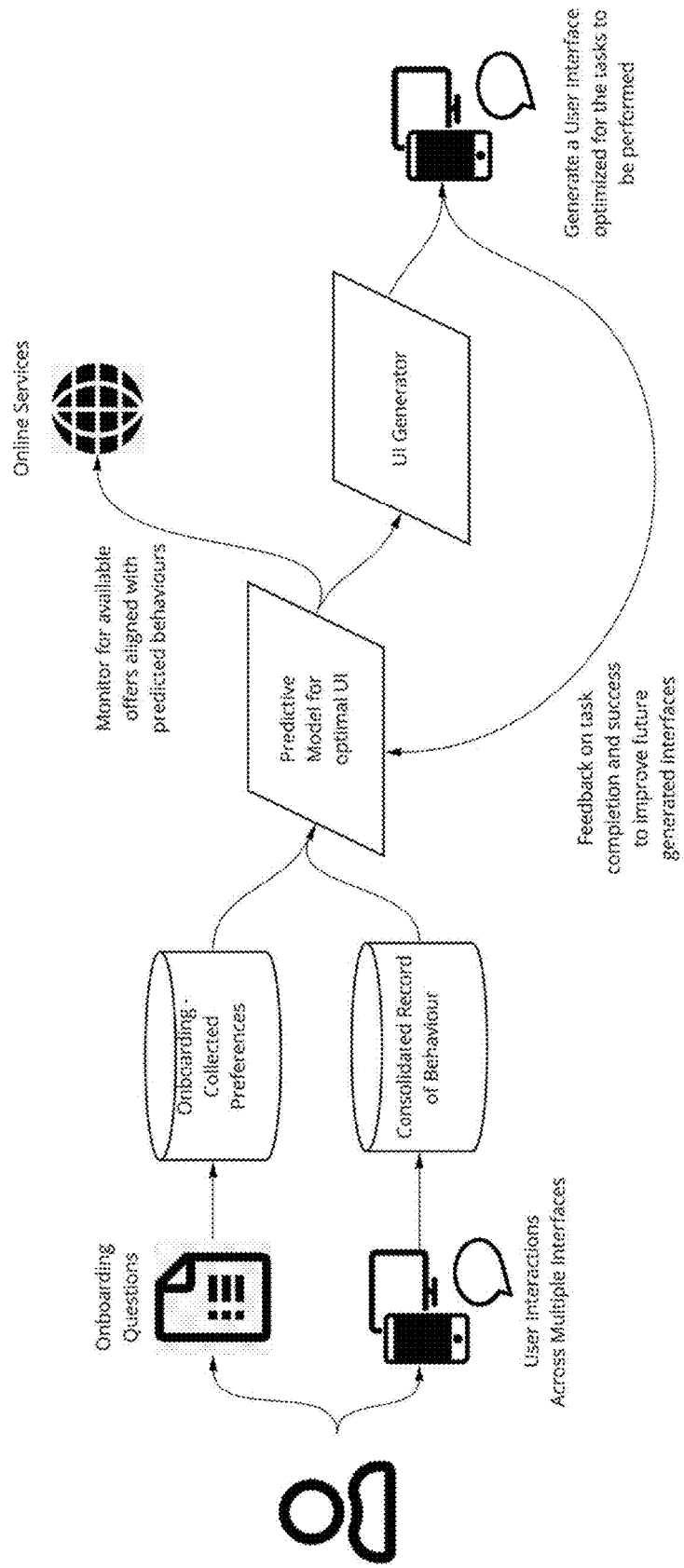
FIG. 7 is a representative block diagram depicting an embodiment of a digital persona.

In an aspect as depicted in FIG. 7, the system comprises: a predictive model representing habits, wants, and goals for a given user and a model of the user interface or set of API's when available representing a task to be performed (e.g. ordering a product or booking a reservation). There is a user interface through which a given user is able to provide feedback on actions that are taken on their behalf. The system further comprises an onboarding process (e.g. questionnaire) that trains the assistant on initial habits and behaviours that will be embodied by the personal digital twin.

Figure 8:
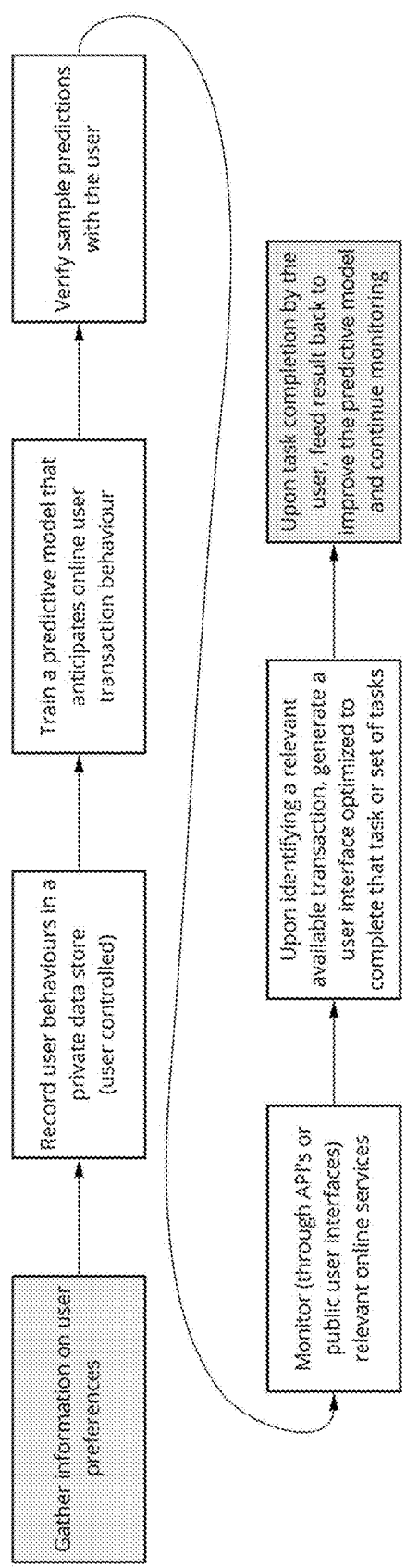
FIG. 8 is a representative flowchart depicting an embodiment of FIG. 7.

In another aspect, the method as depicted in FIG. 8 comprises the following sequence of steps:

Starting with a predictive model trained on behaviours exhibited across a range of users and user preferences. For example, these could include shopping behaviours such as frequency of purchase, repeat purchase of common items. Other examples include travel and booking patterns, for example, annual trips around holidays or purchases around special events such as birthdays and anniversaries.

Then, when onboarding a new user, gathering information related to common behaviours such as: significant dates (birthdays, anniversaries), user purchase history related to special events, travel patterns, and other common behaviours identified as relevant to the model and method.

Presenting and verifying sample predictions with the user based on the model and onboarding and then identifying scenarios that are highly relevant for the user (e.g. opportunities to book a restaurant, make a purchase, book a vacation, etc).

Constructing a user interface that is optimized for the scenario and the individual user, presenting the user interface (UI) to the user, and taking action on behalf of the user based on interactions with the UI.

Updating the predictive model upon completion by feeding the results back into the model.

In embodiments of this invention, the UI itself is optimized to facilitate efficient interaction with the AI for the specific scenario, and could take a number of different forms including: Browser plugin that overlays on an existing UI; an avatar that represents the user in a virtual environment; a conversational assistant (voice or text); or a traditional graphical interface.

In order to operate across a wide range of services, the UI may be generated "client-side" with minimal dependencies on the service provider. The interactions between the user and the generated UI are then translated to perform the desired service, either through automated interactions with a source UI or API for the target service.

In another aspect, the described methods herein may be distributed as a non-transitory computer readable medium.

Having thus described several aspects of at least one embodiment, it is to be appreciated that various alterations, modifications, and improvements will readily occur to those skilled in the art. Such alterations, modifications, and improvements are intended to be within the scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

This written description uses examples to disclose the invention and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A method, comprising:
   receiving a self-identified user intent and shopping preferences from a user of a computing device with a user interface for a usage session, wherein the receiving comprises:
      displaying an intercept survey to the user of the computing device at a start of the usage session; and
      collecting the self-identified intent of the user through the intercept survey;
   wherein the computing device communicates with a web server through a network, and the web server comprises a UI (user interface) component library storing reusable interface components and a behavior data history database;
   collecting usage data of the usage session of the user of the computing device and the user interface through an analytics service;
   labelling each usage session of the user with the self-identified user intent and the shopping preference;
   training a classifier on the usage data of the user session, the self-identified user intent, and the shopping preferences, the classifier for predicting an unclassified user intent of an unclassified user based on an unclassified user usage data and the self-identified unclassified user intent and shopping preferences;
   training a predictive model by:
      collecting historical user behavior data and interaction patterns with user interface components from the behavior data history database;
      generating a behavioral database mapping useby the at least one processorr intents to optimal interface configurations; and
      applying a machine learning algorithm to identify features and values that strongly represent each behavioral segment;
   assigning an assigned user intent to the unclassified user intent by using the classifier on the unclassified user usage data, the self-identified unclassified user intent, and the unclassified user shopping preferences, the unclassified user now a classified user;
   generating, by the web server, different graphical user interfaces tuned for different user categories by selecting components from the UI component library;
   modifying the user interface in response to the assigned user intent for facilitating the assigned user intent and shopping preferences of the classified user using the predictive model to dynamically select and deploy interface components from the UI component library tuned for the assigned user intent, wherein the modifying comprises:
   analyzing real-time user interaction patterns;
   predicting probability of user intent before site exit;
   automatically adapting interface components when intent probability exceeds a threshold; and
   collecting post-interaction data to refine future predictions;
   wherein the user intent is selected from a predetermined list of user intents.

2. The method of claim 1, wherein, the modifying step, further comprises:
   receiving a secondary user intent of the classified user, the secondary user intent from a secondary communication channel;
   modifying the user interface in response to the assigned user intent and the secondary user intent for facilitating the assigned user intent and the secondary user intent of the classified user.

3. The method of claim 1, wherein, the self-identified user intent is provided automatically by a digital representation of the user.

4. The method of claim 1, wherein, the predetermined list of user intents are quality perfectionist, novelty conscious/fashion conscious, price conscious, habitual shopper, brand loyalist, impulse buyer, recreational shopper, and convenience seeker.

5. The method of claim 1, wherein, the user intent includes the shopping preferences of the user.

6. A system, comprising:
   a memory;
   a processor, operatively connected to the memory, the processor configured to:
      receive a self-identified user intent and shopping preferences from a user of a computing device with a user interface for a usage session, wherein the receiving comprises:
         displaying an intercept survey to the user of the computing device at a start of the usage session; and
         collecting the self-identified intent of the user through the intercept survey,
      wherein the computing device communicates with a web server through a network, and the web server comprises a UI (user interface) component library storing reusable interface components and a behavior data history database;

collect usage data of the usage session of the user of the computing device and the user interface through an analytics service;

label each usage session of the user with the self-identified user intent and the shopping preference;

train a classifier on the usage data of the user session, the self-identified user intent, and the shopping preferences, the classifier for predicting an unclassified user intent of an unclassified user based on an unclassified user usage data and a self-identified unclassified user intent, and unclassified user shopping preferences;

train a predictive model by:
  collecting historical user behavior data and interaction patterns with user interface components from the behavior data history database;
  generating a behavioral database mapping user intents to optimal interface configurations; and
  applying a machine learning algorithm to identify features and values that strongly represent each behavioral segment;

assign an assigned user intent to the unclassified user intent by using the classifier on the unclassified user usage data, the self-identified unclassified user intent, and the unclassified user shopping preferences, the unclassified user now a classified user;

wherein the web server is configured to generate different graphical user interfaces tuned for different user categories by selecting components from the UI component library;

modify the user interface in response to the assigned user intent for facilitating the assigned user intent and shopping preferences of the classified user using the predictive model to dynamically select and deploy interface components from the UI component library optimized for the assigned user intent, wherein the modifying comprises:
  analyzing real-time user interaction patterns;
  predicting probability of user intent before site exit;
  automatically adapting interface components when intent probability exceeds a threshold; and
  collecting post-interaction data to refine future predictions;
wherein the user intent is selected from a predetermined list of user intents.

7. The system of claim 6, wherein, to modify the user interface in response to the assigned user intent for facilitating the assigned user intent of the classified user, the system is further configured to:
receive a secondary user intent of the classified user, the secondary user intent from a secondary communication channel;
modify the user interface in response to the assigned user intent and the secondary user intent for facilitating the assigned user intent and the secondary user intent of the classified user.

8. The system of claim 6, wherein, the self-identified user intent is provided automatically by a digital representation of the user.

9. The system of claim 6, wherein, the predetermined list of user intents are quality perfectionist, novelty conscious/fashion conscious, price conscious, habitual shopper, brand loyalist, impulse buyer, recreational shopper, and convenience seeker.

10. The system of claim 6, wherein, the user intent includes the shopping preferences of the user.

11. The method of claim 1, wherein:
the generating of the different graphical user interfaces further comprises:
  generating a first graphical user interface emphasizing product quality metrics for users in a quality perfectionist category; and
  generating a second graphical user interface emphasizing price comparisons is generated for users in a price conscious category; and
the predetermined list of user intents comprises:
  quality perfectionist; and
  price conscious.

* * * * *